United States Patent [19]

Peterson et al.

[11] Patent Number: 5,490,966
[45] Date of Patent: Feb. 13, 1996

[54] METHOD FOR STRIPPING OPEN ENDED BELLOWS PART FROM INJECTION MOLD

[75] Inventors: Robert J. Peterson, Loveland; Michael D. Webb, West Chester, both of Ohio; Reuben E. Oder, Union, Ky.

[73] Assignee: The Procter & Gamble Company, Cincinnati, Ohio

[21] Appl. No.: 333,449

[22] Filed: Nov. 2, 1994

[51] Int. Cl.$^6$ ............................ B29C 45/43; B29C 45/44
[52] U.S. Cl. ................. 264/318; 264/328.1; 264/335; 249/63; 425/556; 425/577; 425/437; 425/DIG. 58
[58] Field of Search ...................... 264/318, 335, 264/328.1, 537; 249/63, 66 A, 66 C, 59; 425/556, 554, 437, DIG. 58, 577, 468

[56] References Cited

U.S. PATENT DOCUMENTS

| | | |
|---|---|---|
| 2,396,406 | 3/1946 | Anderson . |
| 3,660,002 | 5/1972 | Morroni . |
| 3,733,384 | 5/1973 | Gerlovich et al. ...................... 264/98 |
| 3,892,512 | 7/1975 | Diehl . |
| 3,950,468 | 4/1976 | Rainville ................................. 264/97 |
| 4,164,523 | 8/1979 | Hanning ................................. 264/28 |
| 4,289,726 | 9/1981 | Potoczky .............................. 264/318 |
| 4,375,948 | 3/1983 | Von Holdt ............................ 425/437 |
| 4,438,065 | 3/1984 | Brown .................................. 264/335 |
| 4,531,703 | 7/1985 | Underwood ......................... 249/66 A |
| 4,620,959 | 11/1986 | Goto et al. ............................ 264/318 |
| 4,653,997 | 3/1987 | Sheffield et al. ..................... 425/556 |
| 5,006,376 | 4/1991 | Arima et al. ......................... 428/34.1 |

*Primary Examiner*—Jill L. Heitbrink
*Attorney, Agent, or Firm*—Ronald W. Kock

[57] ABSTRACT

A method for stripping an open ended bellows part from an injection mold has as a first step the injection molding of a bellows part. The bellows part has a resilient portion located between a core pin and a first split cavity and a substantially rigid portion located between the core pin and a second cavity. The substantially rigid portion has a first open end and an external undercut portion, and the resilient portion of the bellows part has an inner surface and a second open end. The first split cavity opens laterally to permit the resilient portion of the bellows part to be stripped from the core pin. Compressed gas passes through the core pin to the inner surface of the resilient portion of the bellows part while both open ends of the bellows part are closed off by the second cavity and the core pin. As the cavity and core portions of the mold separate, the second cavity grips the undercut portion of the substantially rigid portion of the bellows part, thereby pulling the resilient portion of the bellows from the core pin while compressed gas maintains the resilient portion expanded. Finally, the second cavity either opens or has a stripper rod to disengage the undercut portion of the substantially rigid portion of the bellows part so that the bellows part may be ejected from the injection mold.

8 Claims, 3 Drawing Sheets

METHOD FOR STRIPPING OPEN ENDED BELLOWS PART FROM INJECTION MOLD

FIELD OF THE INVENTION

The present invention relates to the manufacture of molded bellows parts, and more particularly to such bellows parts wherein both ends are open. Even more particularly, the present invention relates to methods for stripping open ended bellows parts from an injection mold.

BACKGROUND OF THE INVENTION

Resiliently deformable bellows are used as sealing boots around flexible couplings, as flexible couplings themselves, as collapsible containers, etc. A particular application of interest for a bellows is as a replacement for a piston, return spring, and cylinder in pump devices, particularly lotion pumps and trigger sprayers.

Pump devices require pressurization of a fluid in order to dispense the fluid. Pistons and cylinders have historically been used to generate fluid pressure. In a trigger sprayer which is used predominantly for low viscosity fluids, for example, a piston and cylinder arrangement provide either high friction and good fluid sealing, or low friction and a certain amount of bypass leakage. Neither of these combinations is desirable. Piston and cylinders are also known for binding during axial movement, which causes erratic actuator motion.

A cylindrical resilient bellows serves as both a pumping chamber and a return spring. The bellows changes volume by virtue of axial deformation. A bellows has a series of interconnected pleats which have walls that act as conical ring springs. The summation of conical ring bending resistance's for all of the individual pleats determines the axial resilience of the bellows. The primary advantage of a bellows is that it can provide a lower actuation force than a piston, return spring, and cylinder combination. A bellows resistance to axial deflection is less than the sliding friction between piston and cylinder and the force of a piston return spring. Also, a bellows is a single part, and therefore it has no assembly and critical fit considerations. Because there are no sliding parts, there is no dynamic sealing required for a bellows.

A bellows is statically sealed to the moving parts of a pump device. This is typically achieved by connecting two open ends of a bellows to rigid actuator parts by snap-fitting or thermal or adhesive bonding. The actuator parts may contain one-way valving so that when the actuator is released, the bellows pumping chamber expands due to bellows resilience, thereby drawing in fluid through an inlet valve. When the actuator is actuated, the bellows pumping chamber contracts, pressurizing the fluid as the inlet valve closes while an exit valve opens to discharge the fluid.

Manufacturing a bellows with both ends open is not without difficulties. Such bellows may be made by blow molding or by injection molding. Blow molding is a simpler process, but it results in less precise wall thickness of the conical ring portions of the pleats. Resistance to bellows pleat deflection is a function of conical ring thickness cubed. Therefore, trigger sprayer bellows are made by injection molding so that their axial deflection resistance is more controllable. Also, injection molding permits the addition of other functional elements, such as valves and valve springs, atomizer elements, etc., molded integrally with the bellows.

Injection molding of bellows is a well known process. The trick, of course, when injection molding any part with radial undulations or undercuts, is stripping the part from the mold elements. Typically, injection molded bellows are hand stripped or pushed off a mold core pin. Such stripping of a still warm part often results in permanent damage to the bellows from abrasion with the mold. Alternatively, bellows have been molded with one end closed so that air can be used to inflate the bellows to blow it off the core pin. However, the resulting bellows must thereafter undergo a post processing operation to remove the closed end, and additional scrap results.

Arima et al. U.S. Pat. No. 5,006,376, issued Apr. 9, 1991, discloses an open ended conical bellows shape which has specific proportions and is made of specific material in order that it may be stripped from an injection mold. The extreme limitations on proportions and materials exemplifies the difficulty of stripping a bellows from a mold without damaging the bellows.

What has been missing is a method for injection molding a bellows having both ends open as molded, which uses a compressed gas to expand the bellows while it is pulled off the core pin of the mold. Such a method, which is automated to have low cycle time and which requires no external mechanisms, is an object of the present invention.

SUMMARY OF THE INVENTION

One aspect of the present invention is a method for stripping an open ended bellows part from an injection mold. The method has as a first step the injection molding of a bellows part having two open ends. The bellows part has a resilient portion located between a core pin and a first split cavity and a substantially rigid portion located between the core pin and a second split cavity. The substantially rigid portion has a first open end and an external undercut portion, and the resilient portion of the bellows part has an inner surface and a second open end.

Other steps involve opening the first split cavity to permit the resilient portion of the bellows part to be stripped from the core pin; transmitting compressed gas through the core pin to the inner surface of the resilient portion while the open ends of the bellows part are closed off by the second split cavity at the first open end and by the core pin at the second open end; and gripping the undercut portion of the substantially rigid portion of the bellows part by the second split cavity. Additional steps comprise separating the core pin axially from the second split cavity so that the second split cavity pulls the resilient portion of the bellows part from the core pin while compressed gas maintains the resilient portion expanded; and then opening the second split cavity to disengage the undercut portion of the substantially rigid portion of the bellows part so that the bellows part may be ejected from the injection mold.

The core pin may have passages connected to a source of compressed gas. Such passages also have fluid communication with the inner surface of the bellows part. Thus, the step of transmitting compressed gas to the inner surface of the resilient portion comprises pressurizing the passages of the core pin. These passages may result from a porous metal core pin or shallow channels in the core pin.

Alternatively, the core pin has a free end, a longitudinal hole therethrough, a valve seat at the free end, and a poppet valve which has a valve rod extending through the longitudinal hole. The poppet valve is biased against the valve seat, and the longitudinal hole is connected to a source of compressed gas which cannot flow until the poppet valve is unseated. The step of transmitting compressed gas to the inner surface of the resilient portion comprises unseating the poppet valve.

Still another alternative involves gripping the undercut portion of the bellows part by a solid second cavity which has a stripper rod for pushing the annular first open end of the bellows part from the cavity.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
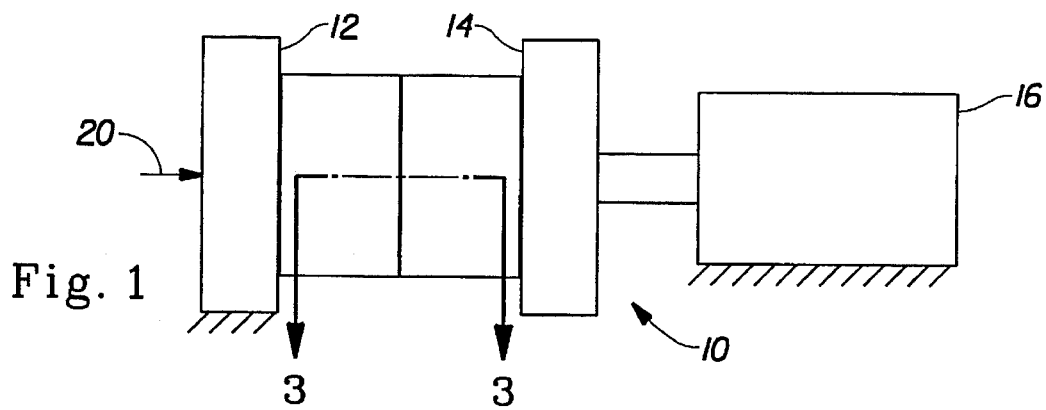
FIG. 1 is a front elevation view of a preferred method of the present invention for stripping an open ended bellows part from an injection mold, disclosing a fixed cavity end and a movable core end of an injection molding machine in the closed position.
Figure 2:
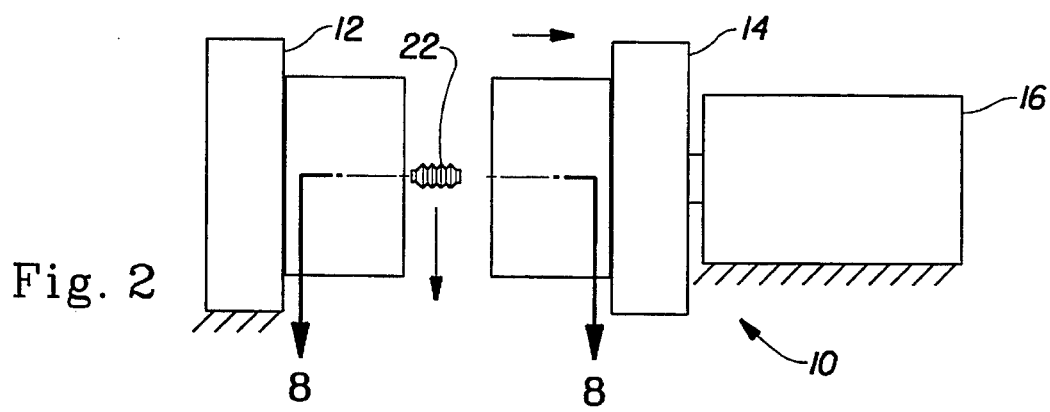
FIG. 2 is a front elevation view thereof, disclosing the movable core end of an injection molding machine in an opened position with a bellows part being ejected.

Referring now to the drawings, and more particularly to FIGS. 1 and 2, there is shown an injection molding apparatus, which provides a method of the present invention for stripping an open ended bellows part from an injection mold and is generally indicated as 10. Injection molding machine 10 has a cavity end 12 which is fixed in position and a core end 14 which is movable by a hydraulic cylinder 16. FIG. 1 shows an arrow 20 to indicate where the injection of plastic enters the mold section of the machine to form a bellows part 22. FIG. 2 shows cavity end 12 and core end 14 axially separated when hydraulic cylinder 16 is retracted, ejecting bellows part 22 therefrom. Such a machine is well known in the art. In a particularly preferred embodiment, machine 10 is an Arburg 40 ton toggle press, Polyronica U version, made by Arburg, Inc. of Kensington, Conn. The preferred mold is a four cavity mold with each of the four cavities operating similar to the single cavity operation illustrated herein.

Figure 3:
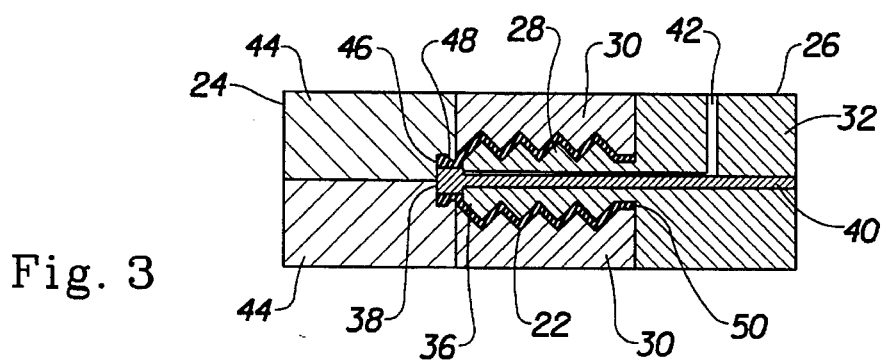
FIG. 3 is a sectioned top plan view of cavity and core portions of the mold of the present invention, taken along section line 3—3 of FIG. 1, showing the cavities of the mold closed around a core pin and a bellows part newly formed therebetween.

The present invention is the method by which a cavity portion 24 and a core portion 26 operate within the machine to form and strip an open ended bellows part from the machine. FIG. 3 shows mold portions 24 and 26 in a closed position. Core mold portion 26 has a core pin 28 having the inner shape of a bellows, and a first split cavity 30 having the outer shape of a bellows when closed around core pin 28. First split cavity 30 is preferably split along a plane parallel to a longitudinal axis (not shown) of the core pin such that two halves may be opened perpendicular to the longitudinal axis. First split cavity 30 can open in any direction, however, as long as such opening results in the cavity clearing the molded bellows part so that the bellows part can be stripped from the core pin as hereinafter described.

Core pin 28 has a body 32 and a free end 34. Free end 34 has a valve seat 36 for a poppet valve. Because the molded part is a bellows, core pin 28 has a series of undercuts along its length which cause removal of the molded part from the core pin to be difficult.

Core mold portion 26 also has a poppet valve 38 seated in valve seat 36, and a valve rod 40 substantially centered within core pin 28 in a longitudinal clearance hole through the core pin. Poppet valve 38 is opened and closed by sliding valve rod 40 axially, either mechanically or by compressed gas pressure applied to the valve rod. Poppet valve 38 is biased closed by a means not shown. The purpose of poppet valve 38 is to admit compressed gas (from a source not shown), which flows from an inlet 42 in core body 32 along the outside of valve rod 40 to valve seat 36, and finally to an inner surface 23 of the resilient portion of bellows part 22 to expand the bellows for stripping it from core pin 28. A poppet valve which is seated closed during molding also serves to prevent molten plastic entering the compressed gas passage during molding.

Cavity mold portion 24 has a second split cavity 44, which when closed surrounds poppet valve 38 where second split cavity 44 contacts first split cavity 30. Second split cavity 30 is preferably split along a plane parallel to the longitudinal axis (not shown) of the core pin such that two halves may be opened perpendicular to the longitudinal axis of core pin 28. Second split cavity 30 could open in a different direction, however, to disengage bellows part 22 as described hereinafter.

In order for the operation of the mold components of the present invention to function properly, poppet valve 38 has a shape which readily slides out of a first open end 46 of bellows part 22. Additionally, second split cavity 44 provides an undercut 48 in the substantially rigid portion of bellows part 22, which enables closed split cavity 44 to externally grip the substantially rigid portion near first open end 46 for stripping purposes. The substantially rigid portion of bellows part 22 at first open end 46 is more rigid than the resilient corrugated portion of the bellows because undercut 48 results in a thickened annulus at first open end 46.

Bellows part 22 has a second open end 50, which is generally the larger diameter of the two open ends so that it may be more easily stripped off the core pin. Bellows part 22 is molded of a resilient material such that the bellows will expand somewhat under the pressure of compressed gas to enable stripping it from the core pin. In a particularly preferred embodiment of the present invention, bellows part 22 is molded of ethylene vinyl acetate resin, grade UE632 available from Quantum Chemicals, of Cincinnati, Ohio. Injection molding machine conditions are: 375° F. nozzle temperature, 375° F. front temperature, 350° F. middle temperature, 300° F. rear temperature, 335° F. actual melt temperature, 1000 psi first stage injection pressure, 800 psi second stage injection pressure, 100 psi back pressure, 1.5 second injection time, 5 second hold time, 10 second cooling time, 0.1 second recycle time, 1 second injection delay time, and 6.5 second machine movement time. Bellows part 22 has resilient portion maximum diameter of about 19 mm and a length of about 25 mm. First open end 46 is about 9 mm in diameter and second open end 50 is about 17 mm in diameter. Undercut 48 has a root diameter of about 16 mm.

Figure 4:
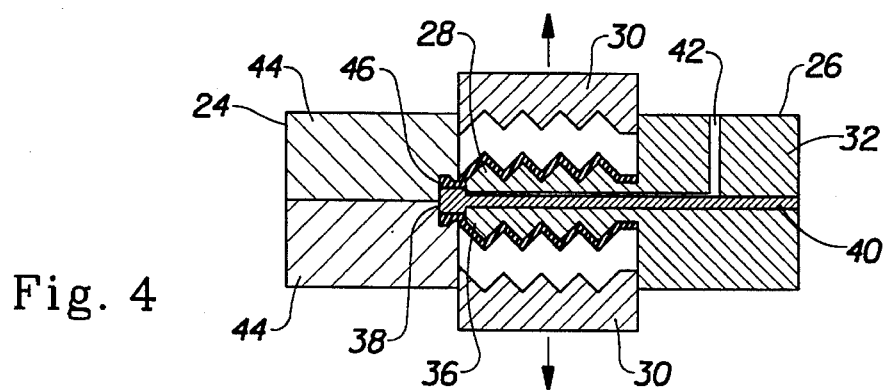
FIG. 4 is a sectioned top plan view thereof, similar to FIG. 3, showing a first split cavity opening perpendicular to the axis of the core pin.

FIG. 4 shows the first step in stripping the bellows part from the core pin. First split cavity 30 opens perpendicular to the longitudinal axis of core pin 28 to provide a gap between first split cavity 30 and core pin 28 so that bellows part 22 may be expanded.

As an alternative to the poppet valve arrangement to permit compressed gas to expand the bellows, the core pin may be made of porous metal. Compressed gas is valved externally to core body 32 at the proper time, and the compressed gas passes through the pores of core pin 28. In this alternative, no moving parts internal to the core pin, such as a poppet valve, are needed. Core pin 28 then has a free end 34 which fills first open end 46 of bellows part 22 during molding.

Figure 9:
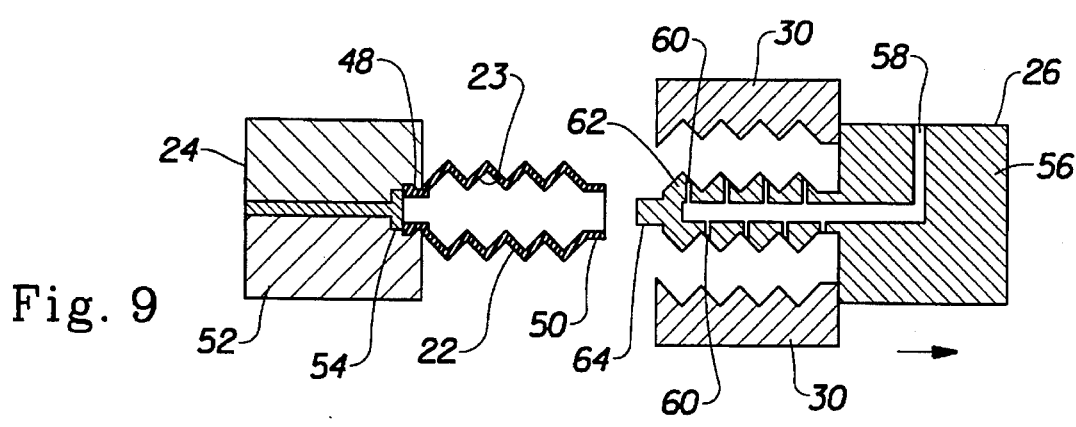
FIG. 9 is a sectioned top plan view of an alternative embodiment, similar to FIG. 7, showing a solid cavity with stripper rod at the cavity portion of the mold, and a core pin having shallow channels without a poppet valve at the core portion of the mold.
Figure 10:
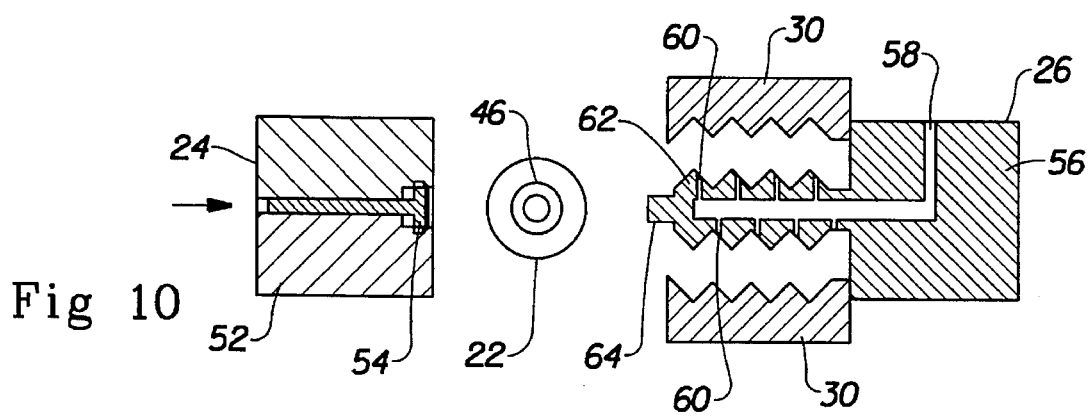
FIG. 10 is a sectioned top plan view thereof, similar to FIG. 8, showing the stripper rod ejecting the bellows part from the solid cavity.

Another similar alternative is to provide shallow radial channels along the core pin which are deep enough to pass compressed gas but shallow enough to prevent molten plastic entering them. A longitudinal hole through the core pin feeds compressed gas from an external source to the channels. Such an arrangement is shown in FIGS. 9 and 10. Of course, channels would eliminate the need for a poppet valve.

Figure 5:
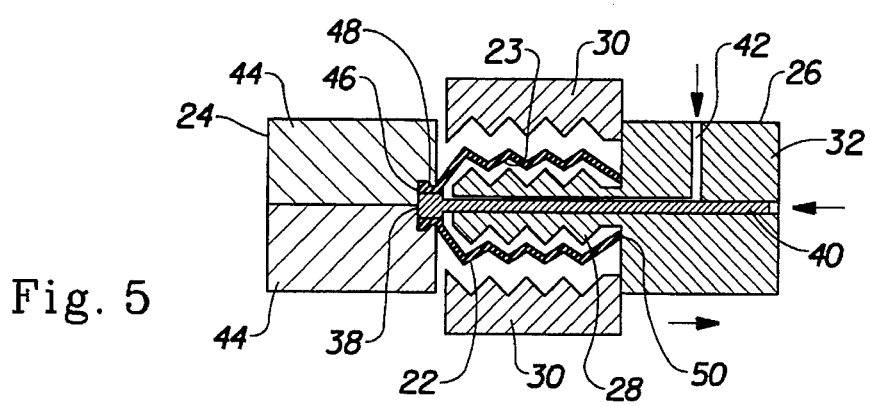
FIG. 5 is a sectioned top plan view thereof, similar to FIG. 3, showing the beginning of axial separation of cavity and core portions of the mold while a poppet valve opens to permit compressed gas to expand the resilient bellows part.

FIG. 5 shows the beginning of axial separation of cavity mold portion 24 and core mold portion 26. Meanwhile poppet valve 38 opens to permit compressed gas to expand the resilient portion of bellows part 22. First open end 46 is maintained closed by second split cavity 44 externally gripping the end of the bellows at undercut 48, as poppet valve 38 is withdrawn from inside bellows 22. Second open end 50 remains closed at core body 32 when compressed gas expands the bellows. Annular second end 50 is slightly more rigid than the corrugated part of the bellows. As bellows part 22 is stripped axially from core pin 28 by the separation of cavity and core mold portions 24 and 26, second open end 50 of bellows part 22 slides along core pin 28 and maintains a mostly gas-tight seal with the core pin. Even if some compressed gas leaks out from bellows part 22 at second open end 50, there is sufficient compressed gas flow to maintain bellows part 22 expanded enough for stripping it off core pin 28. Typical compressed gas is compressed air at 60–80 psig.

Figure 6:
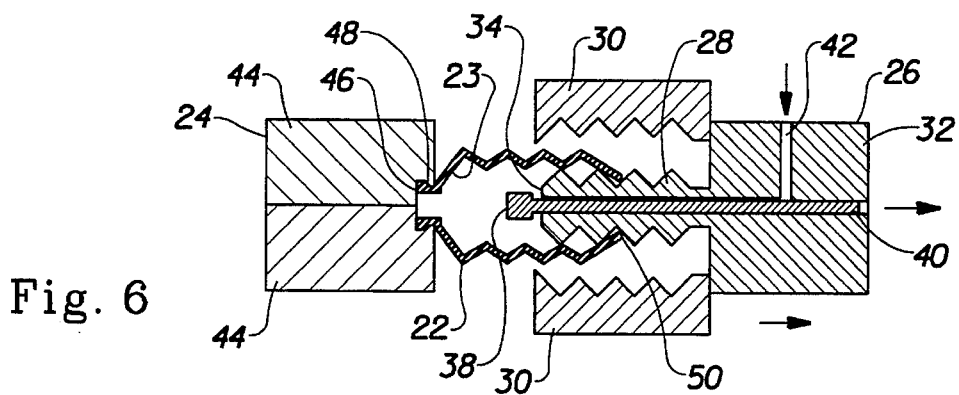
FIG. 6 is a sectioned top plan view thereof, similar to FIG. 3, showing further axial separation of the cavity and core portions of the mold, wherein the bellows part is gripped by the cavity portion and stripped from the core portion while expanded by compressed gas.

FIG. 6 shows further axial separation of cavity mold portion 24 and core mold portion 26. The bellows part is gripped by closed split cavity 44 and stripped from core pin 28 while bellows part 22 remains expanded by compressed gas. Poppet valve 38 remains open until bellows part 22 is stripped from core pin 28.

Figure 7:
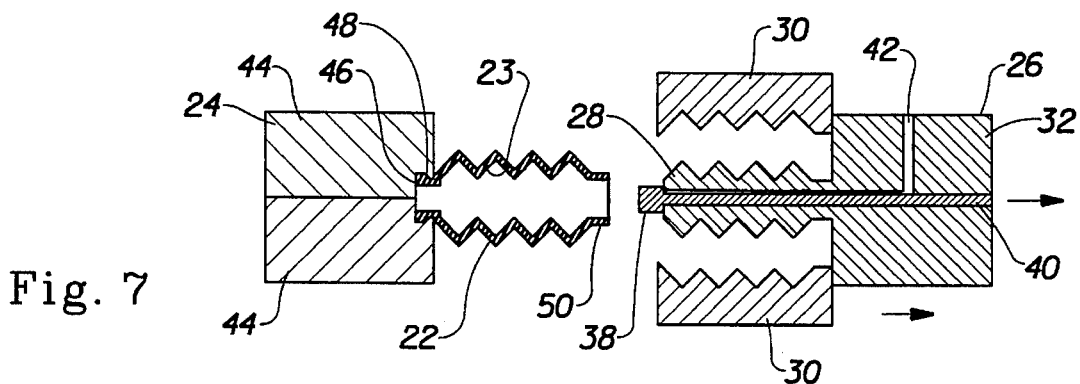
FIG. 7 is a sectioned top plan view thereof, similar to FIG. 3, showing the cavity and core portions of the mold fully separated or in the open position, with the bellows part stripped from the core portion and the poppet valve closed.

FIG. 7 shows cavity and core mold portions 24 and 26 fully separated or open. Bellows part 22 no longer engages core pin 28. Poppet valve 38 is closed against valve seat 36, thereby closing the flow of compressed gas. Bellows part 22 remains gripped by second split cavity 44.

Figure 8:
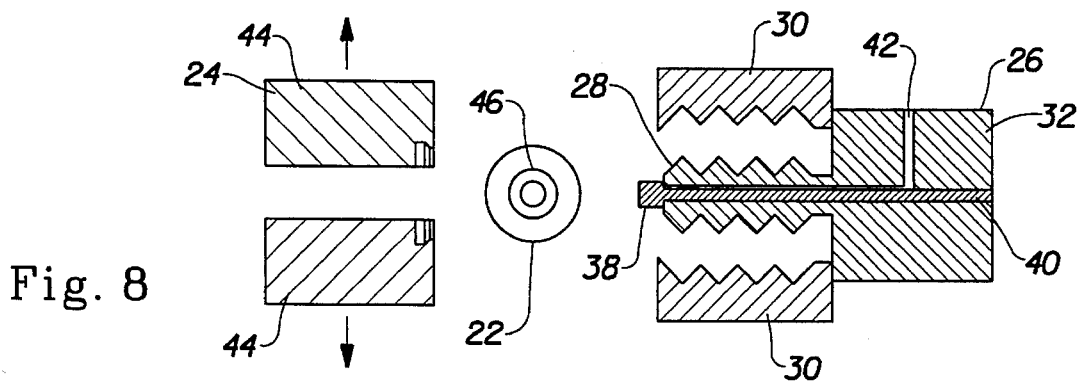
FIG. 8 is a sectioned top plan view of the cavity and core portions of the mold of the present invention, taken along section line 8—8 of FIG. 2, showing a second split cavity opened perpendicular to the axis of the core pin, thereby releasing the bellows part for ejection.

FIG. 8 shows second split cavity 44 opening perpendicular to the axis of core pin 28, thereby releasing the bellows part at first open end 46 so that the part may be ejected. Compressed air blow off is a typical means for ejecting bellows part 22 from an injection mold. However, means for such blow off is not shown. Bellows part 22 is shown dropping out of the mold from between the separated mold portions.

Alternatively, second cavity 44 may not be split. FIG. 9 shows a solid cavity 52 which grips undercut potion 48 of bellows part 22. To release undercut portion 48 from the solid second cavity, a stripper rod 54 pushes the annular first open end 46 of the substantially rigid portion of the bellows part 22 out of the second cavity, as shown in FIG. 10. FIGS. 9 and 10 also show an alternative core body 56, which has a compressed gas inlet 58 connected to core pin channels or passages 60 in core pin 62. Core pin 62 has an extension 64 which replaces poppet valve 38.

Referring again to FIG. 8, once bellows part 22 has exited the mold, first split cavity 30 and second split cavity 44 close, and core mold portion 26 moves axially against cavity mold portion 24. In this condition the mold is ready for another injection molding cycle to begin.

An alternative to the operation of cavity and core mold portions 24 and 26 could allow first split cavity 30 to remain with cavity mold portion 24 instead of with core mold portion 26. Since first split cavity 30 preferably opens perpendicular to the longitudinal axis of the core pin before any axial separation occurs, no other cycle changes would be necessary to accommodate such an alternative.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method for stripping a bellows part from an injection mold comprising the steps of;

a) injection molding a bellows part having two open ends around a core pin, said core pin having a longitudinal axis and a first split cavity surrounding said core pin, said bellows part having an undercut portion;

b) opening said first split cavity to permit said bellows part to be stripped from said core pin;

c) expanding said bellows part outward from said core pin;

d) gripping said bellows part at said undercut portion by a gripping means; and e) pulling said bellows part at said undercut portion by said gripping means to remove said bellows part from said core pin while said bellows part is expanded outwardly from said core pin, said gripping means comprising a solid cavity which grips said undercut portion of said bellows part, said solid cavity separating axially from said core pin to pull said bellows part from said core pin while said bellows part is expanded outwardly from said core pin.

2. A method for stripping a bellows part from an injection mold comprising the steps of:

a) injection molding a bellows part having two open ends around a core pin, said core pin having a longitudinal axis and a first split cavity surrounding said core pin, said bellows part having an undercut portion;

b) opening said first split cavity to permit said bellows part to be stripped from said core pin;

c) expanding said bellows part outward from said core pin;

d) gripping said bellows part at said undercut portion by a gripping means; and e) pulling said bellows part at said undercut portion by said gripping means to remove said bellows part from said core pin while said bellows part is expanded outwardly from said core pin, said gripping means comprising a second split cavity which grips said undercut portion of said bellows part, said second split cavity separating axially from said core pin to pull said bellows part from said core pin while said bellows part is expanded outwardly from said core pin.

3. A method for stripping an open ended bellows part from an injection mold comprising the steps of:

a) injection molding a bellows part, said bellows part having a resilient portion located between a core pin and a first split cavity and a substantially rigid portion located between said core pin and a second split cavity, said substantially rigid portion having a first open end and an external undercut portion, said resilient portion having an inner surface and a second open end;

b) opening said first split cavity to permit said resilient portion of said bellows part to be stripped from said core pin;

c) passing compressed gas through said core pin to said inner surface of said resilient portion while said first and second open ends of said bellows part are closed off by said second split cavity and said core pin, respectively, thereby expanding said resilient portion outwardly from said core pin;

d) gripping said undercut portion of said substantially rigid portion of said bellows part by said second split cavity;

e) separating said core pin axially from said second split cavity, thereby pulling said resilient portion of said bellows part from said core pin while compressed gas maintains said resilient portion expanded; and f) opening said second split cavity to disengage said undercut portion of said substantially rigid portion of said bellows so that said bellows part may be ejected from said injection mold.

4. The method of claim 3 wherein said core pin has passages connected to a source of compressed gas, said passages also having fluid communication with said inner surface of said resilient portion of said bellows part, said step of expanding said resilient portion comprising passing compressed gas from said source through said passages of said core pin to said bellows part.

5. The method of claim 3 wherein said core pin has a free end, a longitudinal hole therethrough, a valve seat at said free end, and a poppet valve having a rod extending through said longitudinal hole, said poppet valve being biased against said valve seat, said longitudinal hole being connected to a source of compressed gas which cannot flow until said poppet valve is unseated, said step of expanding said resilient portion comprising unseating said poppet valve so that compressed gas passes from said source through said poppet valve to said inner surface.

6. A method for stripping an open ended bellows part from an injection mold comprising the steps of:

a) injection molding a bellows part, said bellows part having a resilient portion located between a core pin and a split cavity and a substantially rigid portion located between said core pin and a solid cavity, said substantially rigid portion having a first open end and an external undercut portion, said resilient portion having an inner surface and a second open end;

b) opening said split cavity to permit said resilient portion of said bellows part to be stripped from said core pin;

c) passing compressed gas through said core pin to said inner surface of said resilient portion while said first and second open ends of said bellows part are closed off by said solid cavity and said core pin, respectively, thereby expanding said resilient portion outwardly from said core pin;

d) gripping said undercut portion of said substantially rigid portion of said bellows part by said solid cavity;

e) separating said core pin axially from said solid cavity, thereby pulling said resilient portion of said bellows part from said core pin while compressed gas maintains said resilient portion expanded; and f) operating a stripper rod to push said bellows part out of said solid cavity.

7. The method of claim 6 wherein said core pin has passages connected to a source of compressed gas, said passages also having fluid communication with said inner surface of said resilient portion of said bellows part, said step of expanding said resilient portion comprising passing compressed gas from said source through said passages of said core pin to said bellows part.

8. The method of claim 6 wherein said core pin has a free end, a longitudinal hole therethrough, a valve seat at said free end, and a poppet valve having a rod extending through said longitudinal hole, said poppet valve being biased against said valve seat, said longitudinal hole being connected to a source of compressed gas which cannot flow until said poppet valve is unseated, said step of expanding said resilient portion comprising unseating said poppet valve so that compressed gas passes from said source through said poppet valve to said inner surface.

\* \* \* \* \*